US005769935A

United States Patent [19]
Swan

[11] Patent Number: 5,769,935

[45] Date of Patent: Jun. 23, 1998

[54] USE OF FLUOROCARBONS AS A FUSING AGENT FOR TONERS IN LASER PRINTERS

[75] Inventor: Ellen Louise Swan, Lancaster, N.Y.

[73] Assignee: AlliedSignal Inc., Morristown, N.J.

[21] Appl. No.: 756,751

[22] Filed: Nov. 26, 1996

[51] Int. Cl.$^6$ .................................................. C09D 7/12

[52] U.S. Cl. ............................ 106/311; 430/33; 430/124; 430/201

[58] Field of Search ............................ 430/33, 124, 201; 106/311

[56] References Cited

U.S. PATENT DOCUMENTS 5,219,490 6/1993 Basu et al. .............................. 252/171

5,333,042 7/1994 Brennan et al. ........................ 355/292

*Primary Examiner*—David Brunsman

*Attorney, Agent, or Firm*—Colleen D. Szuch

[57] ABSTRACT

A method and composition for fusing toner to paper using hydrofluorocarbons or perfluorinated $C_1$–$C_4$ alkyl alkyl ethers as a toner fusing agent in a cold fusion process. The composition utilizes a uniform mixture of at least one chlorine-free hydrofluorocarbon or perfluorinated $C_1$–$C_4$ alkyl alkyl ether or mixture thereof, and preferably at least one toner stabilizer and/or an optional solvent. When used, the chlorine-free composition achieves satisfactory fusing and is more environmentally advantageous than chlorine containing toner fusing agents. The composition has a zero ozone depletion potential and a low global warming potential.

24 Claims, No Drawings

USE OF FLUOROCARBONS AS A FUSING AGENT FOR TONERS IN LASER PRINTERS

FIELD OF THE INVENTION

The present invention relates to a method of fusing toner to paper using hydrofluorocarbons or perfluorinated $C_1$–$C_4$ alkyl alkyl ether. The invention further pertains to a composition suitable for cold fusion which employs hydrofluorocarbons or perfluorinated $C_1$–$C_4$ alkyl alkyl ethers as toner fusing agents.

BACKGROUND OF THE INVENTION

It is known in the art that hot fusion laser printing on a substrate such as paper includes the steps of character generation, character transfer to the paper, and subsequent character fusion on the paper. Character fusion by the hot fusion laser printing process creates a permanent image on the paper by heating characters which have been transferred onto the paper. The characters are typically composed of colored, polymeric toner powder. The toner is ordinarily composed of a polymer such as polyester, styrene/acrylate polymer or polyvinyl butyryl resin and a pigment such as carbon black.

In comparison to the hot fusion laser printing process, the known cold fusion process achieves significantly higher printing speeds. The cold fusion process provides a solvent laden vapor zone in which a fusing agent is used to fuse together, and to the paper, toner particles as the paper is passed through the vapor zone. Compositions such as blends of trichlorotrifluoroethane (CFC-113) and acetone as well as dichlorofluoroethane (HCFC-141b) have been used as fusing agents in the cold fusion process. U.S. Pat. No. 5,333,042 teaches a cold fusion method using various hydrochlorofluorocarbons.

However, in recent years, chlorine containing hydrochlorofluorocarbons have proven to be environmentally unacceptable. Therefore, a need exists for environmentally acceptable fusing agents.

DESCRIPTION OF THE INVENTION AND PREFERRED EMBODIMENTS

It is the unexpected discovery of the invention that satisfactory fusing of a toner composition may be achieved when using a toner fusing agent comprising a chlorine-free hydrofluorocarbon or a perfluorinated alkyl alkyl ether. Thus, the invention provides a method of fusing a toner composition comprising: contacting the toner composition with a toner fusing agent, which toner fusing agent comprises at least one chlorine-free hydrofluorocarbon, perfluorinated $C_1$–$C_4$ alkyl alkyl ether or a mixture thereof. The invention also provides a toner fusing agent which comprises a stable, uniform mixture of at least one chlorine-free hydrofluorocarbon, perfluorinated $C_1$–$C_4$ alkyl alkyl ether or mixture thereof and at least one toner stabilizer.

In the process of the present invention, a fine black powder, generally referred to as toner, applied in the form of characters onto a substrate, such as paper, is passed through a vapor of at least one chlorine-free hydrofluorocarbon or perfluorinated $C_1$–$C_4$ alkyl alkyl ether or a mixture thereof. Useful toners are well known in the art and typically are fine powders of polyester, styrene/acrylate polymer or polyvinyl butyryl polymer and a pigment such as carbon black. These toners are commercially available as Canon NP G-Z and Canon CLC 500, among others. Characters may be generated by a computer and unfused toner characters applied to a substrate such as paper or film base by any of a variety of laser printers known in the art. Suitable laser printers are commercially available from Canon, Hewlett Packard, Brother and other manufacturers. These unfused toner characters are then contacted with a toner fusing agent in a process called cold fusion. The cold fusing process is more fully described in U.S. Pat. No. 5,333,042 which is incorporated in its entirety herein by reference.

The toner may be applied to a substrate by any means known in the art. For example, a computer may begin the printing process by signaling a laser printer to retrieve a substrate, such as a blank sheet of paper, from an input tray and transferring it to an input station. The input station leads the paper to a position adjacent to a photosensitive drum. Characters are generated by forming them on a rotating drum in the laser printer. Initially, the surface of the photosensitive drum is charged to a positive polarity. Subsequently, a laser in conjunction with an acousto-optical deflection system, a polygon mirror and a laser optics assembly, selectively forms characters on portions of the surface of the photo-sensitive drum by removing the charge in character areas. Thus, only the areas occupied by laser generated characters have a neutral polarity on the photosensitive drum, while the remaining area of the photosensitive drum remains positively charged.

Continuous rows of dots are formed on the rotating photosensitive drum creating a representation of the character to be printed. As will be appreciated by one skilled in the art, "character" as used in this context refers to any graphic figure, expression, representation, or any part thereof generated on the polarized photosensitive drum. The photosensitive drum is rotated past a developer station which contains a polyester toner or styrenic polymer toner. The toner is positively charged and is applied across the width of the rotating photosensitive drum by the developer station. The toner, having a positive charge, is repelled into the charge removed areas of the photosensitive drum to represent the characters that will be printed. This process is well known to the art as, for example, in U.S. Pat. No. 4,311,723 which is incorporated herein by reference.

Character transfer occurs as the paper, which is energized with a very strong negative charge moves past a transfer station. Character transfer is accomplished since the differential between the charged paper and the toner is so strong that the toner is attracted away from the surface of the photosensitive drum onto the paper. The toner is held to the paper by the charge difference, and at this stage could be blown or brushed off the paper. A cold fusion step is subsequently performed to cause the toner to adhere securely to the paper. Upon completion of character transfer, the paper is transported by means of a paper transport mechanism to a cold fusing station.

The process of fusing the toner to the paper is accomplished by forming a vapor bath of a toner fusing agent in a cold fusion station, and passing the unfused toner through the vapor bath to achieve cold fusion of the characters. After toner transfer to the substrate, the photosensitive drum rotates past a corona discharge which discharges the positively polarized areas of the photosensitive drum. Thereafter, a cleaning brush removes excess toner for recycling as well as to electrically clean the photosensitive drum. Subsequently, the corona discharge electrically charges the surface of the drum with a positive charge. These steps are then repeated for additional printing.

In the process of the invention, a vapor bath is created by forming vapors of a toner fusing agent containing at least one chlorine-free hydrofluorocarbon, perfluorinated $C_1$–$C_4$ alkyl alkyl ether, or mixtures thereof by heating the agent in a cold fusion station or chamber. The chlorine-free hydrofluorocarbons and perfluorinated $C_1$–$C_4$ alkyl alkyl ethers have a zero ozone depletion potential and a global warming potential of not more than about 1600 on a 100 year time horizon. The most preferred toner fusing agents of this invention generally have no flash point as determined by ASTM D 56–87.

Suitable chlorine-free hydrofluorocarbons for use in this invention non-exclusively include $HCF_2CHFCF_2CH_2F$ (HFC-356pecq); $CF_3CF_2CH_2CH_2F$ (HFC-356mcfq); $CF_3CFHCFHCF_2CF_3$ (HFC-43-10); $HCF_2CHFCHFCF_2H$ (HFC-356peep); $HCF_2CHFCF_2H$ (HFC-245ea); $CF_3(CF_2)_2CH_2CH_3$ (HFC-467mccf); $(CF_3)_2CFCH_2CH_3$ (HFC-467 tertiary); $H(CF_2)_4CH_2F$ (HFC-449pccc); $CF_3(CF_2)_3CH_2CH_3$ (HFC-569mccc); and $C_8H_6F_{10}$ (HFC-1345 dimers). These fluorocarbons are either commercially available or may be prepared by any means well-known in the art. Of these, the preferred fusing agents are $HCF_2CHFCF_2CH_2F$(HFC-356pecq); $HCF_2CHFCHFCF_2H$ (HFC-356peep); $HCF_2CHFCF_2H$ (HFC-245ea); $CF_3(CF_2)_2CH_2CH_3$ (HFC-467mccf); $(CF_3)_2CFCH_2CH_3$ (HFC-467 tertiary); $H(CF_2)_4CH_2F$ (HFC-449pccc); $CF_3(CF_2)_3CH_2CH_3$ (HFC-569mccc); and $C_8H_6F_{10}$ (HFC-1345 dimers), with $HCF_2CHFCF_2H$ (HFC-245ea) and $C_8H_6F_{10}$ (HFC-1345 dimers) being more preferred.

Useful perfluorinated $C_1$–$C_4$ alkyl alkyl ether fusing agents non-exclusively include perfluorobutylmethyl ether and perfluorobutylethyl ether. Both are commercially available.

In another embodiment of the invention, the chlorine free hydrofluorocarbon or perfluorinated $C_1$–$C_4$ alkyl alkyl ether may be present in mixture with a commercially available fusing agent stabilizer and/or a solvent. Useful stabilizers non-exclusively include nitroalkanes having from about 2 to about 3 carbon atoms, phosphite esters having from about 12 to about 30 carbon atoms, acetals having from about 4 to about 7 carbon atoms, amines having from about 6 to about 8 carbon atoms and mixtures thereof. The most preferred stabilizers are 1,4-dioxane, nitromethane, epoxybutane and mixtures thereof.

Useful solvents non-exclusively include $C_1$–$C_8$ alcohols, $C_1$–$C_8$ ketones, $C_1$–$C_8$ esters, miscible $C_1$–$C_8$ alkanes and mixtures thereof. The preferred solvents are $C_1$ to $C_3$ alcohols, methyl ethyl ketone, acetone, methyl acetate, ethyl acetate and miscible $C_5$ to $C_8$ alkanes. The more preferred solvents are dichloromethane, methanol, acetone, trans-1,2-dichloroethylene and methyl acetate.

When a solvent component is present in the toner fusing agent it is preferably present in an amount, based upon the total weight of the toner fusing agent and solvent, of from greater than about 0% to about 50%, preferably from about 0.5% to about 25%, and most preferably from about 1% to about 15%. When the toner stabilizer component is present, it is preferably present in the toner fusing agent in an amount, based upon the total weight of toner fusing agent and stabilizer, of from greater than about 0% to about 2.0%, more preferably from 0.05% to about 1%, and most preferably from about 0.1% to about 0.5% by weight of the toner fusing agent.

In use, a vapor cloud of the toner fusing agent and optional stabilizer and/or solvent is generated in a heated cold fusing station or chamber. The vapor cloud is generally confined in a cold fusion chamber by a chilled air interface at a temperature, dependent upon the boiling point of the fusing agent selected, and that is developed by a set of condensing coils which are located near the top of the fusing station. The density of the vapor cloud is controlled by measuring the impenetrability of the cloud by an ultrasonic sensor. The toner fusing agent is then introduced, dependent on the measured density of the cloud, into the system by droplets that are emitted onto the surface of the hot plate. The fusing agent is introduced in an amount sufficient to enable the fusion of toner to itself and the substrate. The droplets of fusing agent are, in turn, vaporized to increase the density of the confined cloud.

Cold fusion of the characters is done by transporting the paper through the toner fusing agent vapor cloud. The solvency characteristics of the fusing agent liquefies the toner which is then absorbed by the paper. The evaporation rate of the fusing agent insures that the toner is fixed to the paper. Finally, the paper exits the cold fusion chamber by means of a deflection roller. Thereafter, it passes through a set of exit rolls and onto a forms stacker. Cold fusion processes are well known in the art and details set forth in any of a variety of references including U.S. Pat. No. 5,333,042.

The following non-limiting examples serve to illustrate the invention.

EXAMPLE

Three types of toner were applied to strips of paper by dragging the strips through a container of each respective toner listed. The paper was then introduced into a stainless steel chamber containing a toner fusing agent vapor for approximately two seconds. The chamber is heated to 75° C. and uses a −6° C. cooling coil.

The toners used were Canon NP G-Z black (polyesters), Canon CLC-500 magenta (polyester) and a black styrene acrylic based toner available from Interscience. The toner fusing agents are hydrofluorocarbons or perfluorinated alkyl alkyl ethers either alone or with an organic solvent.

The following Table illustrates the efficacy of the selected agent for fusing the given toner to the paper. A "yes" indicates that the toner on the paper's surface remained smudgeless when that surface was contacted with another paper. Certain hydrochlorocarbons and hydrochlorofluorocarbons were also tested as controls

| TONER FUSING AGENT | FORMULA | NP G-Z Toner | CLC 500 Toner | Styrene Acrylic Toner |
|---|---|---|---|---|
| none | | no | no | no |
| CFC-113 | $CCl_2FCClF_2$ | no | no | no |
| HCFC-141b | $CCl_2FCH_3$ | yes | yes | yes |
| HCFC-123 | $HCCl_2CF_3$ | yes | yes | yes |
| HCFC-225 ca/cb | $HCCl_2CF_2CF_3$/ $CF_2ClCF_2CFCl$ | yes | yes | yes |
| HCFC-253fb | $CF_3CH_2CH_2Cl$ | yes | yes | yes |
| HFC-356mcfq | $CF_3CF_2CH_2CH_2F$ | no | no | no |
| HFC-356mcfq/ 2 wt % n-propanol | | no | no | no |
| HFC-356mcfq/ 5 wt % Dichloro-methane | | yes | yes | yes |
| HFC-356pecq | $HCF_2CHFCF_2CH_2F$ | yes | yes | yes |
| HFC-356peep | $HCF_2CHFCHFCF_2H$ | yes | yes | yes |
| HFC-245ea | $HCF_2CHFCF_2H$ | yes | yes | yes |
| HFC-245ea/ MeOH | | yes | yes | yes |

-continued

| TONER FUSING AGENT | FORMULA | NP G-Z Toner | CLC 500 Toner | Styrene Acrylic Toner |
|---|---|---|---|---|
| HFC-245ca | $CHF_2CF_2CH_2F$ | no | no | no |
| HFC-245ca/ 14 wt % acetone | | no | no | no |
| HFC-245fa | $CF_3CH_2CF_2H$ | no | no | no |
| HFC-245fa/ 15 wt % Cyclopentane | | no | no | no |
| HFC-245fa/ 6 wt % hexane | | no | no | no |
| HFC-43-10 | $CF_3CFHCFHCF_2CF_3$ | no | no | no |
| HFC-43-10/ trans-1,2-di-chloroethylene | | yes | yes | yes |
| HFC-43-10/ trans/methanol | | yes | yes | yes |
| HFC-55-10 | $CF_3CF_2CH_2CH_2CF_2CF_3$ | no | no | no |
| HFC-458mfc | $CF_3CH_2CF_2CH_2CF_3$ | no | yes | no |
| HFC-467 mccf | $CF_3(CF_2)_2CH_2CH_3$ | yes | yes | yes |
| HFC-467 (tertiary) | $(CF_3)_2CFCH_2CH_3$ | yes | yes | yes |
| HFC-449 pccc | $H(CF_2)_4CH_2F$ | yes | yes | yes |
| HFC-569mccc | $CF_3(CF_2)_3CH_2CH_3$ | no | yes | no |
| HFC-52-13 | $CF_3(CF_2)_3CH_2CH_3$ | no | no | no |
| HFC-1345 dimers | $C_8H_6F_{10}$ | yes | yes | yes |
| PF butylmethyl ether | $CF_3(CF_2)_3OCH_3$ | no | no | no |
| PF butylethyl ether | $CF_3(CF_2)_3OCH_2CH_3$ | no | no | no |
| PF butyl-methylether/ 10 wt % acetone | | yes | yes | yes |
| PF butylethyl-ether/10 wt % acetone | | yes | yes | yes |
| PF butylethyl-ether/2.5 wt % acetone | | no | no | no |
| PF butyl-methylether/ 50 wt % trans 1.2-di-chloroethylene | | yes | yes | yes |
| PF butylmethyl ether/5 wt % methyl acetate | | no | no | no |
| PF butylethyl ether/6 wt % methyl acetate | | no | no | no |

The above data show the usefulness of chlorine free hydrofluorocarbons and perfluorinated $C_1$–$C_4$ alkyl alkyl ethers as toner fusing agents.

What is claimed is:

1. A toner fusing agent which comprises a stable, uniform mixture of at least one chlorine free hydrofluorocarbon selected from the group consisting of $HCF_2CHFCF_2CH_2F$, $CF_3CF_2CH_2CH_2F$, $CF_3CFHCFHCF_2CF_3$, $HCF_2CHFCHFCF_2H$, $CF_3(CF_2)_2CH_2CH_3$, $(CF_3)_2CFCH_2CH_3$, $H(CF_2)_4CH_2F$, $CF_3(CF_2)_3CH_2CH_3$, and $C_8H_6F_{10}$ or perfluorinated alkyl alkyl ether or mixture thereof and at least one toner stabilizer.

2. The toner fusing agent of claim 1 which comprises at least one chlorine-free hydrofluorocarbon.

3. The toner fusing agent of claim 1 which comprises a mixture of chlorine-free hydrofluorocarbons.

4. The toner fusing agent of claim 1 which comprises at least one perfluorinated $C_1$–$C_4$ alkyl alkyl ether.

5. The toner fusing agent of claim 1 which comprises a mixture of perfluorinated $C_1$–$C_4$ alkyl alkyl ethers.

6. The toner fusing agent of claim 1 which comprises a mixture of at least one chlorine-free hydrofluorocarbon and at least one perfluorinated $C_1$–$C_4$ alkyl alkyl ether.

7. The toner fusing agent of claim 1 wherein the hydrofluorocarbon is selected from the group consisting of $HCF_2CHFCF_2CH_2F$, $CF_3CF_2CH_2CH_2F$, $CF_3CFHCFHCF_2CF_3$, $HCF_2CHFCHFCF_2H$, $CF_3(CF_2)_2CH_2CH_3$, $(CF_3)_2CFCH_2CH_3$, $H(CF_2)_4CH_2F$, $CF_3(CF_2)_3CH_2CH_3$, and $C_8H_6F_{10}$.

8. The toner fusing agent of claim 7 wherein the hydrofluorocarbon is $C_8H_6F_{10}$.

9. The toner fusing agent of claim 7 wherein the hydrofluorocarbon is $HCF_2CHFCF_2CH_2F$.

10. The toner fusing agent of claim 7 wherein the hydrofluorocarbon is $HCF_2CHFCHFCF_2H$.

11. The toner fusing agent of claim 7 wherein the hydrofluorocarbon is $CF_3(CF_2)_2CH_2CH_3$.

12. The toner fusing agent of claim 7 wherein the hydrofluorocarbon is$(CF_3)_2CFCH_2CH_3$.

13. The toner fusing agent of claim 7 wherein the hydrofluorocarbon is $H(CF_2)_4CH_2F$.

14. The toner fusing agent of claim 7 wherein the hydrofluorocarbon is $CF_3(CF_2)_3CH_2CH_3$.

15. The toner fusing agent of claim 1 wherein the perfluorinated $C_1$–$C_4$ alkyl alkyl ether is selected from the group consisting of perfluorinated butylmethyl ether and perfluorinated butylethyl ether.

16. The toner fusing agent of claim 1 wherein the chlorine-free hydrofluorocarbon and perfluorinated $C_1$–$C_4$ alkyl alkyl ether have no flash point.

17. The toner fusing agent of claim 1 wherein the toner stabilizer is selected from the group consisting of nitroalkanes having from about 2 to about 3 carbon atoms, phosphite esters having from about 12 to about 30 carbon atoms, acetals having from about 4 to about 7 carbon atoms, amines having from about 6 to about 8 carbon atoms and mixtures thereof.

18. The toner fusing agent of claim 1 wherein the stabilizer is selected from the group consisting of 1,4-dioxane, nitromethane, epoxybutane and mixtures thereof.

19. The toner fusing agent of claim 1 further comprising at least one solvent selected from the group consisting of a $C_1$–$C_8$ alcohols, $C_1$–$C_8$ ketones, $C_1$–$C_8$ esters, miscible $C_1$–$C_8$ alkanes and mixtures thereof.

20. The toner fusing agent of claim 1 further comprising at least one solvent selected from the group consisting of $C_1$ to $C_3$ alcohols, methyl ethyl ketone, acetone, methyl acetate, ethyl acetate and miscible $C_5$ to $C_8$ alkanes.

21. The toner fusing agent of claim 1 further comprising at least one solvent selected from the group consisting of dichloromethane, methanol, acetone, trans 1,2-dichloroethylene and methyl acetate.

22. The toner fusing agent of claim 1 which comprises a mixture selected from the group consisting of $CF_3CF_2CH_2CH_2F$ with dichloromethane; $CF_3CFHCFHCF_2CF_3$ with trans 1,2-dichloroethylene; and $CF_3CFHCFHCF_2CF_3$ with methanol.

23. The toner fusing agent of claim 1 wherein the stabilizer is present in an amount of from greater than about 0 to about 2 percent based on the weight of the toner fusing agent.

24. The toner fusing agent of claim 1 wherein the solvent is present in an amount of from greater than about 0 to about 50 percent based on the weight of the toner fusing agent.

* * * * *

UNITED STATES PATENT AND TRADEMARK OFFICE
CERTIFICATE OF CORRECTION

PATENT NO : 5,769,935
DATED : June 23, 1998
INVENTOR(S) : Swan

It is certified that error appears in the above-identified patent and that said Letters Patent is hereby corrected as shown below:

Column 5, line 24, "$CF_3(CF_2)_3CH_2CH_3$" should read -- $CF_3(CF_2)_4CH_2CH_3$ --.

Signed and Sealed this

Eleventh Day of April, 2000

Attest:

Q. TODD DICKINSON

Attesting Officer

Director of Patents and Trademarks